Patented Nov. 21, 1933

1,935,963

UNITED STATES PATENT OFFICE 1,935,963

PROCESS FOR PURIFICATION OF POLLUTED WATER

Oliver M. Urbain, Columbus, Ohio, assignor to Charles H. Lewis, Harpster, Ohio

No Drawing. Application April 19, 1933
Serial No. 666,933

3 Claims. (Cl. 210—2)

This invention relates to an improved process for the purification of polluted water. It has for its object the provision of an economical and efficient process for this purpose.

In its specific aspect, the invention is directed to a process for the purification of polluted water in which the polluting constituents are organic acids, especially the carboxylic acids. The carboxylic acids have very great biochemical oxygen demands and their removal is a matter of great importance in the purification of many industrial wastes. The carboxylic acids have the common grouping —COOH. They are the principal trouble makers in many wastes. They exist in considerable quantity in the sewage wastes from the fermentation industries, canning, sugar, packing, cellulose, tanning, dairy and cheese, and many others. The carboxylic acids also are found in appreciable quantities in municipal sewage.

The carboxylic acids amino, gluconic, saccaric, acetic, propionic, butyric, valeric, and many others exist all or in part in all the wastes listed above and their removal is necessary before complete purification of the waste can be effected. The salts of these acids are soluble. Consequently they cannot be removed by reaction with an alkali such as calcium hydroxide. Moreover, the salts are subject to hydrolysis, the parent acid being one of the products of hydrolysis. Therefore, the parent acid is still present even after reaction with an alkali.

Many of the industrial wastes listed above are acid in character due to the formation of these carboxylic acids during the manufacturing process. Others become acid as a result of the formation of carboxylic acids in the waste following putrefaction of said waste. In either event the acid condition is ideal for the application of the process of the present invention because the fundamental reaction takes place only in an acid medium.

It has been ascertained that the thionylanilines will react with all carboxylic acids, all acids having the carboxylic grouping, —COOH, insoluble anilides being precipitated. The general formula for the thionylanilines is R.N:S:O, in which R equals any hydrocarbon radical. The general formula for the carboxylic acids is $$R.C\diagdown_{OH}^{O}$$

in which R again equals any hydrocarbon radical or residue.

The general reaction for the thionylanilines and the carboxylic acids is as follows:—

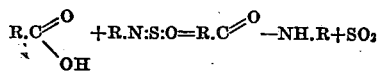

An exemplary specific reaction is as follows:—

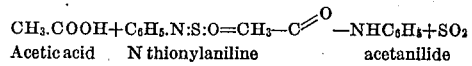

The reaction takes place at all pH's in the acid range. If the reaction is attempted in an alkaline solution the thionylaniline is decomposed with the formation of an alkali sulfite.

The thionylanilines are easily prepared and are comparatively cheap products. They react quantitatively with the carboxylic acids and provide an ideal means of effecting their removal from the various wastes in which they are found.

In carrying out the process it is first necessary to determine that the waste has a pH below pH 7.0. In some manufacturing processes alkalies are employed which result in the wastes having an alkaline reaction. If carboxylic acids are present in such wastes they are of course bound up as salts of the carboxylic acids. By impounding such wastes for short periods of time they become acid and are then in proper condition for the application of the process. The step of impounding is seldom found necessary.

The quantity of carboxylic acids, both free and bound, is then determined and the thionylaniline added in gram molecular equivalents, the solution agitated for 2 to 4 minutes, and passed into a sedimentation basin or through a filter. The precipitated anilides settle rapidly. It may be desired to follow the treatment with a coagulant in which event I add an alkali and the coagulant since the anilides are not decomposed by alkalies.

The process is extremely economical, simple and very easily adapted to the removal of carboxylic acids, and has wide utility.

Having thus described my invention what I claim is:—

1. A process for removing carboxylic acids from water comprising introducing to the water a thionylaniline to react with the carboxylic acids and precipitate insoluble anilides.

2. A process for removing carboxylic acids from water comprising bringing the solution to a pH below 7.0, adding to the solution of thionylaniline in approximately gram molecular equivalents to the carboxylic acids present therein to react therewith and precipitate anilides.

3. A process for removing carboxylic acids from water comprising bringing the solution to a pH below 7.0, adding to the solution a thionylaniline in approximately gram molecular equivalents to the carboxylic acids present therein and agitating the solution for a period of from 2 to 4 minutes to thereby precipitate anilides.

OLIVER M. URBAIN.